United States Patent Office 3,323,914
Patented June 6, 1967

3,323,914
PRODUCTION OF TANTALUM ANODES
Christopher J. B. Fincham, Boston, and Gerard J. Villani, Newton, Mass., assignors to National Research Corporation, Cambridge, Mass., a corporation of Massachusetts
No Drawing. Filed Aug. 18, 1964, Ser. No. 390,474
6 Claims. (Cl. 75—201)

This invention relates to the production of tantalum anodes for electrical capacitors, particularly to such anodes having very high capacitance per unit volume and per unit weight.

Improved tantalum anodes for capacitors have been described recently in an article published by Pierret, Shtasel, Knight and Michael, "Journal of the Electrochemical Society," vol. 110, No. 1, pp. 12–15 (January 1963). In the technique described by Pierret et al., the anodes are prepared by the reaction, in situ, of $Ta_2O_5$ and carbon.

It is a principal object of the present invention to provide a process of the above general type having substantially improved results from the standpoint of capacitance and leakage of the resultant product.

Another object of the invention is to provide an improved process for making tantalum capacitor anodes by in situ reduction of tantalum oxide by carbon wherein the capacitance per unit volume and per unit weight can be carefully controlled at very high levels.

Another object of the invention is to provide an improved process for making tantalum anodes.

These and other objects of the invention will in part be obvious and will in part appear hereinafter.

In practicing the present invention, it has been discovered that the relationship between the particle sizes of the starting materials is extremely important in obtaining optimum results. In accordance with the present invention, pure tantalum oxide is employed as well as pure carbon. The tantalum oxide and the carbon (which may be very fine powder) are thoroughly and intimately mixed to form a blend having approximately 98% by weight of the amount of carbon for stoichiometric reaction of carbon with $Ta_2O_5$. While 98% is preferred, this range can be somewhat broader going from 96% to slightly over 99%. The carbon is preferably very fine, having an average particle diameter of less than 2 microns, and preferably about 1.3 microns. The actual particle size of the carbon is preferably determined by a Fisher Subsieve Sizer, the Fisher method being described by Gordon and Smith, Ind. Eng. Chem. Analn. Ed. 12, 479–482 (1940). The tantalum oxide preferably has an average particle diameter of between 2 and 10 microns as measured by a Fisher Subsieve Sizer.

In order to more fully understand the invention, reference should be had to the following nonlimiting examples:

EXAMPLE I

Fine carbon powder having an average particle size of about 1.3 microns and tantalum oxide powder having an average particle size of 7.9 microns are thoroughly mixed in a suitable blender. The mixture is adjusted so that 98% of the stoichiometric quantity of carbon is present. A small amount of stearic acid (about 4 weight percent) is added as a binder. The mixture is then pressed into anodes weighing 0.77 g. with a 0.25-inch diameter having a "green" density of about 3.8 grams/cubic centimeter. The binder is removed by heating to 300° C. in vacuum.

The resulant "green" anode is then sintered in a vacuum furnace, the temperature being fairly slowly increased at about 15° C. per minute to 1600° C., and held for one hour at 1600° C. Thereafter, the temperature is raised to 2000° C. and the anode is held for two hours at this temperature.

The anodes made in accordance with the procedure described above were then anodized and tested in accordance with two techniques.

Test Procedure A

This first anodizing technique is called the "modified standard test" and had an anodizing electrolyte consisting of 60% ethylene glycol, 20% oxalic acid, 20% water. The temperature was 105° C. and a current of 35 milliamps per gram was utilized. The final anodizing voltage was 200 volts for a time for 2 hours. The formed anode was then washed in deionized water for one-half hour with a flow of approximately 150 ml. per minute, and dried at 85° C. for one-half hour.

The test cell electrolyte consisted of 30% $H_2SO_4$ aqueous solution. During the test, capacitance and dissipation factor was measured at 25° C. using 0.5 volt A.C. (120 cycles per second). D.C. leakage was measured at 25° C. after five minutes at 125 volts. D.C. leakage was also measured at 85° C. after five minutes at 125 volts.

Test Procedure B

In this "standard test" the anodes were anodized in an electrolyte having 0.01% $H_3PO_4$, at a temperature of 92° C. and a current of 35 milliamps per gram until a voltage of 200 volts was reached. Thereafter, the current was 11.7 milliamps per gram until a voltage of 270 volts was reached; the final voltage being 270 volts. The total anodization time was one hour.

The anodes were then washed as in Procedure A and tested as set forth below. The test solution was 0.01% $H_3PO_4$ and water at 25° C. A test for leakage was made after two minutes at 240 volts.

The anodes were then washed and dried again, the capacitance and dissipation factor was measured in 10% $H_3PO_4$ at 25° C. using 0.5 volt A.C. (120 c.p.s.) signal.

EXAMPLE II

An anode was prepared in essentially the same fashion as that described in Example I except that the final sintering temperature was about 50° C. lower (e.g. 1950° C.). The electrical properties of this anode are given in Table I.

EXAMPLE III

An anode was prepared in a manner essentially the same as Examples I and II except that in this case the Fisher average particle diameter of the tantalum oxide starting material was 3.7 microns. The results of the test on this anode are given in Table I.

A series of anodes manufactured and tested in accordance with the above procedures had a capacitance of over 2500 microfarad volts per gram and over 23,000 microfarad volts per cubic centimeter. These had low D.C. leakage and excellent dissipation factor.

The results of the above tests along with the best prior art (Pierret et al.) tests known to the applicants are plotted below in Table I:

TABLE I

|  | Prior Art I | Prior Art II | Example I | Example I | Example II | Example III |
|---|---|---|---|---|---|---|
| Fisher Average Particle Diameter, μ: |  |  |  |  |  |  |
| Oxide |  |  | 7.9 | 7.9 | 7.9 | 3.7 |
| Carbon |  |  | 1.3 | 1.3 | 1.3 | 1.3 |
| Test Procedure | A | A | A | B | B | B |
| Anode weight, g. | 1.05 | 1.05 | 1.05 | 1.05 | 0.5 | 0.5 |
| Anode density, g./cc | 5.7 | 9.7 | 9.4 | 9.4 | 8.6 | 10.1 |
| Capacitance: |  |  |  |  |  |  |
| μfv./g | 3,050 | 2,250 | 2,560 | 2,600 | 2,920 | 2,560 |
| μfv./cm.³ | 17,400 | 21,800 | 24,000 | 24,900 | 25,100 | 25,900 |
| D.C. Leakage, Tμ./μf.: |  |  |  |  |  |  |
| At 125 v., 25° C | 0.026 | 0.10 | 0.10 |  |  |  |
| 85° C | 0.24 |  | 0.13 |  |  |  |
| At 240 v., 25° C |  |  |  | 0.28 | .25 | .27 |
| Dissipation Factor | 1.2 | 3.3 | 3.0 | 7.4 | 3.3 | 2.0 |
| Breakdown Voltage |  |  |  |  | 410 | 410 |

In the above tests, it is clear that capacitance per cubic centimeter of the anode made in accordance with Examples I, II and III is substantially higher than the capacitance of the higest capacitance per cubic centimeter reported by the prior art reference. Also the capacitance per gram of Examples I, II and III is substantially higher than the only prior art example having a capacitance per unit volume above 21,000 μfv./cm.³. Thus the present invention provides, for the first time, both a high capacitance per unit weight and per unit volume. It should be pointed out that the dissipation factor and leakage compared very favorably in the comparison between Example I and the prior art anode.

Since certain changes may be made in the above process and product without departing from the scope of the invention herein involved, it is intended that all matter contained in the above description shall be interpreted as illustrative and not in a limiting sense.

What is claimed is:

1. The process of forming a tantalum anode which comprises the steps of intimately mixing powers of $Ta_2O_5$ and C, the amount of carbon being about 96 to 99% by weight of the stoichiometric amount of carbon necessary to completely reduce the $Ta_2O_5$ to tantalum metal, the carbon having an average particle size less than 3 microns, the $Ta_2O_5$ powder average particle size being between 2 and 15 microns, compressing the mixed powder to a green anode and firing the anode under vacuum to a temperature of about 2000° C. to produce an anode of high capacitance per unit volume.

2. The process of claim 1 wherein the average carbon particle size is less than 2 microns.

3. The process of claim 1 wherein the average $Ta_2O_5$ particle size is between 2 microns and 10 microns.

4. The process of claim 1 wherein the carbon stoichiometry is about 98%.

5. The process of claim 1 wherein the anode pellets are compressed to a green density of about 3.8 grams/cc.

6. The process of claim 1 wherein the anodes during vacuum firing are maintained at a temperature of about 2000° C. for about 2 hours.

References Cited

UNITED STATES PATENTS 3,144,328   8/1964   Doty _____ 75—200
3,226,263   12/1965  Oswin _____ 75—222 X

FOREIGN PATENTS 252,442   12/1960   Australia.
870,930    6/1961   Great Britain.

OTHER REFERENCES

A. J. Pierret, A. Shtasel, H. T. Knight, and A. B. Michael, "Porous Tantalum Anodes for Liquid and Solid Electrolytic Capacitors by Reaction In Situ," Journal of the Electro-Chemical Society, vol. 110, No. 1, pages 12–15 (January 1963).

CARL D. QUARFORTH, *Primary Examiner.*

L. DEWAYNE RUTLEDGE, *Examiner.*

A. J. STEINER, *Assistant Examiner.*